US012654883B2

(12) United States Patent

Vlacich et al.

(10) Patent No.: US 12,654,883 B2

(45) Date of Patent: Jun. 16, 2026

(54) METHOD FOR DETECTING A FAILURE IN AN AIRCRAFT AND SYSTEM CONFIGURED FOR EXECUTING THE METHOD

(71) Applicant: Airbus Operations (S.A.S.), Toulouse (FR)

(72) Inventors: Christophe Vlacich, Toulouse (FR); Stephan Roux, Toulouse (FR); Thomas Massonneau, Toulouse (FR); Driss El Maamar, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 64 days.

(21) Appl. No.: 18/761,677

(22) Filed: Jul. 2, 2024

(65) Prior Publication Data

US 2025/0011009 A1 Jan. 9, 2025

(30) Foreign Application Priority Data

Jul. 6, 2023 (FR) ...................................... 2307221

(51) Int. Cl.
| | |
|---|---|
| B64F 5/60 | (2017.01) |
| G06N 3/08 | (2023.01) |
| G07C 5/08 | (2006.01) |

(52) U.S. Cl.
CPC ................. B64F 5/60 (2017.01); G06N 3/08 (2013.01); G07C 5/0808 (2013.01); G07C 5/0816 (2013.01)

(58) Field of Classification Search
CPC . B64F 5/60; G06N 3/08; G06N 3/045; G06N 3/09; G07C 5/0808; G07C 5/0816; G05B 23/0235; G05B 23/024; G06F 18/241; G06F 18/2415
See application file for complete search history.

(56) References Cited

U.S. PATENT DOCUMENTS

| | | |
|---|---|---|
| 2020/0082245 A1 | 3/2020 | Hao |
| 2020/0379454 A1 | 12/2020 | Trinh |
| 2021/0358314 A1 | 11/2021 | Hwu |

FOREIGN PATENT DOCUMENTS

| | | | | |
|---|---|---|---|---|
| CN | 111815056 A | * 10/2020 | ............. | G06N 3/045 |
| JP | H06150178 A | 5/1994 | | |

* cited by examiner

*Primary Examiner* — Michael V Kerrigan

(74) *Attorney, Agent, or Firm* — KDW Firm PLLC

(57) ABSTRACT

A method for detecting and localizing a failure of an input sensor of a flight control computer of an aircraft including comparing a first piece of information representative of a probability of occurrence of the failure, delivered by a neural network, with a second piece of information representative of a probability of occurrence of the failure, delivered by a classifier trained to carry out a detection and a localization of the failure. It is thus possible to optimize a failure diagnosis and a localization of a failure of an input sensor used in the determination of flight controls.

10 Claims, 2 Drawing Sheets

METHOD FOR DETECTING A FAILURE IN AN AIRCRAFT AND SYSTEM CONFIGURED FOR EXECUTING THE METHOD

TECHNICAL FIELD

The disclosure herein relates to a method for detecting a failure in a system of an aircraft. The disclosure herein relates more precisely to a method for detecting and for localizing a failure of a sensor connected to an input of a flight control computer of an aircraft.

BACKGROUND

Current aircraft comprise numerous onboard devices and systems which include flight control computers. A flight control computer of an aircraft implements a control of actuators of the aircraft such as for example flight control surfaces of the aircraft (ailerons, elevator, yaw, by way of examples). The flight control commands issued by a such a computer are defined based on control settings but also based on information supplied by sensors associated with the control elements. For example, a flight control computer implements a control of a flight control surface actuator taking into account the detected position of the flight control surface, which position is obtained via a position sensor of this flight control surface. In order to guarantee the safety of operation of the aircraft, a flight control computer implements a monitoring of the various sensors so as to detect and warn of potential failures of the sensors.

Given that a flight control computer must exhibit a very high level of security in its operation, together with very high level of availability, it is usual to devote the processing capacity of a flight control computer processor solely to the control of the aircraft. As a consequence, the monitoring of the sensors by a flight control computer is limited to the detection and to the warning of failures, without including a localization or an identification of the failures detected. A maintenance operator must then carry out a search for the failure, which may for example relate to the sensor itself or to wiring between the sensor and the flight control computer. This search may be even longer as the sensors used are generally passive sensors which are not intended to communicate information on potential failures. It would be desirable to be able to identify and efficiently localize a failure in order to optimize the implementation of the maintenance operations and to reduce the immobilization time of an aircraft under maintenance.

SUMMARY

One object of the disclosure herein is to provide an improved method for detecting and localizing failures of sensors supplying information signals to a flight control computer of an aircraft.

For this purpose, a method is provided for detecting and localizing a failure of an input sensor of a flight control computer of an aircraft, the method being executed by a module for detecting and localizing failures comprising electronic circuitry configured for executing the steps of the method, which comprises:

a conditioning of at least a first signal delivered to the sensor by the flight control computer and a conditioning of at least a second signal delivered to the computer by the sensor, according to a predetermined format, a step for analyzing the conditioned first and second signals by a neural network trained to carry out a detection and a localization of the failure using the first and second signals representative of the conditioned signals delivered by the or to the flight control computer, a step for comparing of a first piece of information representative of a probability of occurrence of the failure, delivered by the neural network and, with a second piece of information representative of a probability of occurrence of the failure, delivered by a classifier trained to carry out a detection and a localization of the failure, using signals representative of the conditioned signals, then, a supply of a third piece of information representative of a probability of occurrence of the failure using the first and second pieces of information.

It is thus advantageously possible to optimize a failure and localization diagnosis or an estimation of localization of a failure of an input sensor useful for the determination of flight controls.

Furthermore, when the module for detecting and localizing failures comprising the electronic circuitry is independent of the main processor or of the main processors of the flight control computer, the processing capacity of these processors remains dedicated to the determination of flight control signals and the performance and safety of the flight controls are accordingly enhanced.

The method for detecting and localizing failures according to the disclosure herein may furthermore comprise the following features, considered in isolation or in combinations:

The method furthermore comprises a comparison of the third piece of information with respect to at least one predetermined threshold value.

The method furthermore comprises a filtering of the third piece of information and a supply of a fourth piece of information representative of a probability of occurrence of the failure using the filtered third piece of information.

Another subject of the disclosure herein is a device for assisting with the detection and the localization of a failure of an input sensor of a flight control computer of an aircraft, the device comprising a module for detecting and localizing a failure comprising electronic circuitry configured for carrying out:

a conditioning of at least a first signal delivered to the sensor by the flight control computer and a conditioning of at least a second signal delivered to the computer by the sensor, according to a predetermined format, a step for analyzing the first and second conditioned signals by a neural network trained to carry out a detection and a localization of the failure using the first and second signals representative of the conditioned signals delivered by the or to the flight control computer, a step for comparing a first piece of information representative of a probability of occurrence of the failure, delivered by the neural network, with a second piece of information representative of a probability of occurrence of the failure, delivered by a classifier trained to carry out a detection and a localization of the failure, using signals representative of the conditioned signals, then, a supply of at least a third piece of information representative of a probability of occurrence of the failure based on the first and second pieces of information.

The device for detecting and localizing failures according to the disclosure herein may furthermore comprise the following features, considered in isolation or in combinations:

The device furthermore comprises electronic circuitry configured for carrying out a comparison of the third piece of information with respect to at least one predetermined threshold value.

The device furthermore comprises electronic circuitry configured for carrying out a filtering of the third piece of information and for carrying out a supply of a fourth piece of information representative of a probability of occurrence of the failure based on the filtered third piece of information.

Another subject of the disclosure herein is a flight control computer device comprising a first, main, processor configured for determining flight control signals and a device for assisting with the detection and the localization of a failure such as previously described comprising a module for detecting and localizing failures, which module comprises the electronic circuitry, which circuitry being independent of the first processor.

Another subject of the disclosure herein is an aircraft comprising a device for assisting with the detection and the localization of a failure or a flight control computer such as previously described.

The disclosure herein lastly relates to a computer program product comprising program code instructions for executing the steps of a method for detecting and localizing failures such as previously described, together with a storage medium comprising a computer program product such as the aforementioned.

BRIEF DESCRIPTION OF THE DRAWINGS

The aforementioned features of the disclosure herein, together with others, will become more clearly apparent upon reading the following description of one exemplary embodiment, the description being presented in relation to the appended drawings.

DETAILED DESCRIPTION

Figure 1:
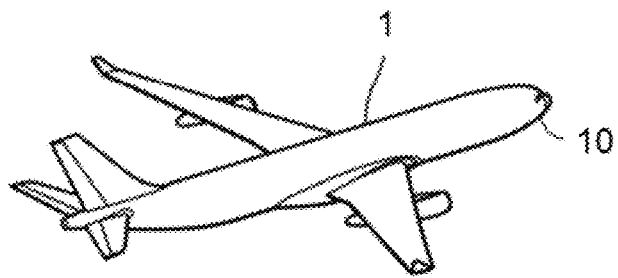
FIG. 1 illustrates an aircraft comprising a device for assisting with the detection and the localization of a failure of an input sensor of a flight control computer according to one embodiment of the disclosure herein.

FIG. 1 shows schematically and symbolically an aircraft 1 comprising a device (not detailed in FIG. 1) for assisting with the detection and the localization of failures of input sensors of a flight control computer of the aircraft 1. Advantageously, such a device on board the aircraft 1 allows the optimization of the detection and the localization of a given failure of a sensor connected to a flight control computer of the aircraft 1. More generally, the device for assisting with the detection and the localization of a failure 10 is configured for detecting a plurality of types of failures and a plurality of failures, together with the localization, at least approximate, if not more precise, of each of the detectable and detected failures for all of the sensors connected to one or more inputs of a flight control computer of the aircraft 1.

In the following part of the description, a connection link carrying a signal, this signal carried by the connection link and also the information coded by this signal carried by this connection link are named without distinction. For example, a reference "P" denotes both an electrical signal P and a connection link P which carries the signal P, as it does information P transported (or coded) by the signal P over the connection link which carries the signal P.

Figure 2:
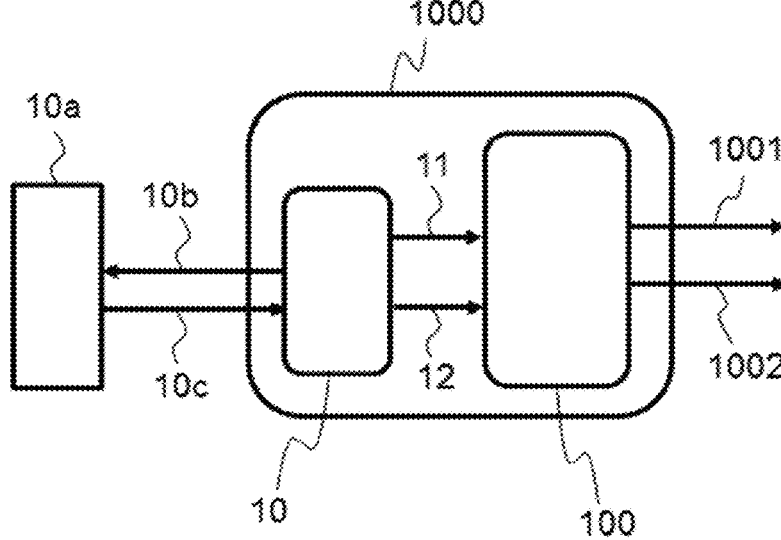
FIG. 2 illustrates schematically a device for assisting with the detection and the localization of a failure of an input sensor of a flight control computer according to one embodiment of the disclosure herein.

FIG. 2 shows schematically and symbolically a flight control computer 1000 of the aircraft 1 inputs of which are connected to sensors, for example position sensors for flight control surfaces of the aircraft 1 and outputs of which are connected to actuators, for example actuators of flight control surfaces of the aircraft 1. For the purpose of simplification, a single sensor 10a is shown in FIG. 2 even though numerous sensors of various natures may be connected to the input of the flight control computer 1000. For the same reasons aimed at simplifying the description of the disclosure herein, a single control signal 1001 for a flight control actuator is illustrated in FIG. 2, even though numerous actuators of various natures may be connected to the output of the flight control computer 1000.

According to the example described, the sensor 10a is connected to the flight control computer 1000 via a first connection carrying a first signal 10b delivered by the flight control computer 1000 to the sensor 10a and by a second connection carrying a second signal 10c delivered to the flight control computer 1000 by the sensor 10a when the first signal 10b has a predetermined form. The signal 10b is for example a signal for electrical power supply of the sensor 10a, or else a signal for electrical excitation of the sensor 10a, useful for its nominal operation. Such an excitation signal allows, for example, a mobile element to be powered whose movement makes an output signal of the sensor 10a vary, such as the signal 10c, for example. It goes without saying and depending on the nature and the type of sensor, that there may be additional connections and several signals of one or more types may be delivered by the computer 1000 to the sensor 10a, and vice versa.

Advantageously, the flight control computer 1000 comprises a device for assisting with the detection and the localization of failures for, notably, the detection and the localization of failures of the sensor 10a. For this purpose, the first and second signals 10b and 10c are connected to the device 10 for assisting with the detection and the localization of failures, inside of the flight control computer 10. In other words, the connections between the flight control computer and the sensor 10a go via the device 10 for assisting with the detection and the localization of failures. The same basically goes for all the connections between the flight control computer 1000 and the various sensors which are connected to it, at the input of the flight control computer 1000. Thus, given that the device 10 for assisting with the detection and the localization of failures is included in the flight control computer 1000, its operation does not require the installation of specific wiring. On the one hand, this allows the operational security to be preserved; on the other hand, this even allows the implementation of such a device for assisting with the detection and the localization of failures in a flight control computer of an existing aircraft by simply replacing the flight control computer. The flight control computer 1000 furthermore comprises a flight command control unit 100, also here referred to as "main processor 100" of the flight control computer. The main processor 100 is configured for determining the state of the flight control outputs to the flight control actuators, as a function of the setpoint inputs and of the information and signals coming from the various sensors connected to the flight control computer. The setpoint signals applied to the flight control computer may come from setpoint devices (for example a flight control lever or yoke in the cockpit of the aircraft 1), and/or coming from a flight assistance device (for example, a system for correcting flight controls or an automated navaid system).

According to one embodiment, the device for assisting with the detection and the localization of failures 10 delivers to the main processor 100 input information in the form of a signal 12, which is representative of the state of the signal 10c supplied by the sensor 10a to the input of the flight control computer 1000, together with the information 11 (also in the form of a signal) representative of a probability of a failure of a predefined type of the sensor 10a at a predefined location of the onboard systems of the aircraft 1. According to one embodiment, the information 11, carried by a coded signal, is composite digital information, in other words it comprises a plurality of fields each representative of an element of information relating to the probability of a failure related to a type of failure of the sensor 10a. For example, an information field codes a type of failure from amongst a list of predetermined types of failures, another information field codes a failure from amongst a list of predetermined failures, yet another field codes an area or location of the failure within the systems of the aircraft from amongst a list of predetermined areas or locations. According to one embodiment, the processor 100 generates an information signal 1002 on at least one of its outputs, based on the internal signal 12, aimed at notifying a third-party system of the presence of a failure on a flight control sensor, for example an alarm device internal to the aircraft 1 or else a ground station configured for supervising the state of the aircraft 1 and the potential maintenance operations to be carried out.

According to one variant embodiment, the information 11 is an analogue or digital signal associated with two predetermined states, one of which states codes a failure detection and the other state codes the absence of a failure. According to this example, it is then the same for the signal 1002.

Ingeniously and advantageously, the device for assisting with the detection and the localization of failures 10 of the flight control computer 1000 comprises a neural network NN and a classifier CLASS, together with a conditioning module PRE configured for carrying out a normalization of the signals transmitted from the flight control computer 1000 to the sensors which are connected to it and from these sensors to the flight control computer 1000.

Advantageously, the neural network NN is configured so as to be able to supply a probability of occurrence of sensor failures, and in particular, from amongst the sensors which are connected to the input of the flight control computer 1000, so as to supply information representative of a probability of occurrence of failures of the sensor 10a. A failure of the sensor 10a may be a failure of the power supply of the sensor 10a, owing to a fault in the connection carrying the signal 10b, or a fault in the connection at the output of the sensor 10a, in other words a failure of the link carrying the signal 10c, or else a failure internal to the sensor 10a, for example a failure of an internal transducer or of any other internal element or component of the sensor 10a. In order to be able to provide information on probability of occurrence of failures, the neural network NN undergoes a prior training using predetermined signals corresponding to a plurality of scenarios or configurations relating to normal states of operation and relating to abnormal states, i.e. malfunction states. This corresponds for example to a supervised learning. According to one embodiment, the neural network NN is trained prior to its insertion into the systems of the aircraft with a view to its use. According to one variant, the neural network NN is employed for the detection and the localization of failures during certain periods of flight and of taxiing on the ground of the aircraft 1 while at the same time still being used in learning mode during other periods of flight and of taxiing of the aircraft 1.

The operations for normalization of the signals applied at the input of the neural network NN allow the conformity of the format of these signals with the signals previously applied during a learning (in particular a supervised learning) phase of the neural network NN to be guaranteed prior to it being used on board the aircraft. The classifier CLASS of the device for assisting with the detection and the localization of failures 10 of the flight control computer 1000 is, for its part, implemented in a "post treatment" unit (or module) POST, which allows, using the same signals as those applied to the input of the neural network NN, a second piece of information on probability of failure of the sensor 10a to be obtained, together with other sensors connected to the input of the flight control computer 1000 not shown in the figures.

Advantageously and ingeniously, it is then possible to verify the coherence of two pieces of information representative of the probability of a failure obtained by two different means that are, on the one hand, a neural network, for example a neural network of the FCNN ("fully connected neural network") type and a classifier connected to a database of information on failures, then to supply a third piece of information on probability of occurrence of a failure of a sensor connected to the input of the flight control computer 1000. This allows a desired performance of the device for assisting with the detection and the localization of failures 10 to be attained using a less complex neural network than if the neural network were used alone (without a classifier). This furthermore allows the training of the neural network to be simplified, for example by using a more restricted set of training data, the classifier allowing the fairly improbable scenarios for which the neural network would not have been trained to be pre-empted.

It should be noted that the learning phase or phases of the neural network NN, together with the structure of the classifier CLASS associated with a database DB are such that information on probability of a failure comprises or is associated with information on localization of the failure. For example, the scenarios retained for simulating or reproducing failures of the input sensors of the flight control computer 1000, or connected circuits useful for the operation of the sensors, comprise reproductions or simulations of failures of the same type at different locations. For example, in the case of a leakage current, the failure leading to such a leakage current is implemented at several places of the same electrical equipotential link, so as to obtain various and varied configurations of the other signals linked with the same sensor as that for which a failure is simulated.

According to one embodiment, the device for assisting with the detection and the localization of a failure 10 of a sensor is independent of the main processor 100 in the flight control computer 1000. In other words, this means that, except for the signals delivered by the device 10 to the main processor 100, these two elements do not share their respective computing powers for performing processing operations. In other words again, the detection and/or the localization of failures is carried out by the device 10 and notified to the main processor 100 which may take them into account for the determination of the flight controls, but the computing power of the main processor 100 is not made available to the method for detecting and localizing failures of an input sensor of the flight control computer 1000, in order to optimize safety in the determination of the flight controls of the aircraft 1.

Figure 3:
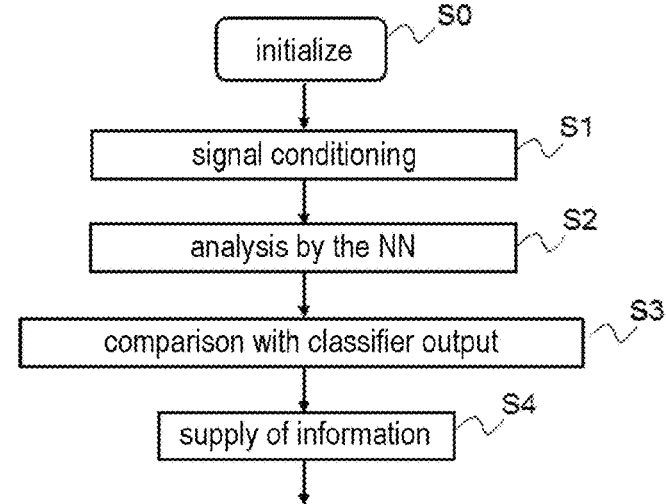
FIG. 3 illustrates schematically a method for assisting with the detection and the localization of a failure of an input sensor of a flight control computer executed by the device for assisting and localizing of a failure already illustrated in FIG. 2.

FIG. 3 is a flow diagram illustrating steps of a method for supplying information representative of a probability of occurrence of a failure of the sensor 10a connected to the input of the flight control computer 1000, using two other intermediate pieces of information representative of a probability of occurrence of a failure of the sensor 10a respectively obtained by a network of the neural network NN type of the device for assisting with the detection and the localization of a failure and of the classifier CLASS of this same device for assisting with the detection and the localization of a failure 10.

An initial step S0 is a step for initializing all of the systems described at the end of which all the systems of the aircraft are correctly initialized, configured and capable of operating in a nominal manner. During a step S1, the device for assisting with the detection and the localization of a failure 10 performs a conditioning, also referred to as normalization or ensuring compliance of the signals in relation to the sensor 10a, whether this be signals coming from the sensor 10a or else signals going to the sensor 10a. The signals thus conditioned are applied to the input of the neural network NN, on the one hand, and to the input of the classifier CLASS, on the other. Subsequently, during a step S2, the neural network NN determines and provides a first piece of information P1 representative of a probability of a failure based on an analysis of the signals 10b and 10c conditioned and applied to the input of the neural network NN.

The signals 10b and 10c being furthermore applied to the input of the classifier CLASS, a second piece of information P2 representative of a probability of a failure is determined by the classifier CLASS connected to its database DB, using signals 10b and 10c conditioned then applied to the input of the classifier CLASS, so as to then compare, during a step S3, the first information P1 representative of a probability of a failure and the second information P2 representative of a probability of a failure thus obtained. A third piece of information P3 representative of a probability of occurrence of a failure of the sensor 10a, coming from the comparison between the first information P1 representative of a probability of a failure and the second information P2 representative of a probability of a failure, is then determined during the step S3, so as to implement a classification step, then supplied at the output of the device for assisting with the detection and the localization of a failure during a step S4.

According to one embodiment, the information signal 11 delivered by the device for assisting with the detection and the localization of a failure 10 is a signal carrying or coding the information P3. According to one embodiment, an additional step for comparing the information P3 with one or more threshold values T is carried out so as to implement an improved decision step for detecting a failure of the sensor 10a. According to one embodiment, a final time filtering is carried out at the output of the device for assisting with the detection and the localization of a failure so as to eliminate spurious transients and to confirm over time the state of the final information representative of a probability of occurrence of a failure, supplied at the output of the device 10.

Figure 5:
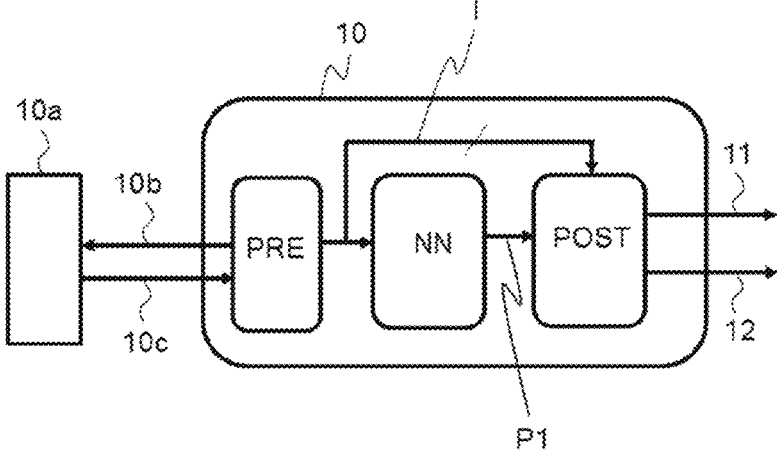
FIG. 5 illustrates schematically internal details of the device for assisting and localizing a failure already illustrated in FIG. 2, comprising a post-processing unit; and, FIG. 6 illustrates schematically details of the post-processing unit already illustrated in FIG. 5 of the device for assisting and localizing a failure.

FIG. 5 illustrates schematically internal details of the device for assisting with the detection and the localization of a failure 10 connected to the sensor 10a via the connection links carrying the signals 10b and 10c. The pre-processing module PRE is configured for carrying out the conditioning or normalization of the signals 10b and 10c and for delivering on its output as many normalized signals as there are signals applied to its input. The set of output signals applied to the input of the neural network NN is called I and is furthermore applied to the input of the post-processing module POST performing a processing operation subsequent to the determination of the information P1, namely the operations carried out during the steps S3 and S4 of the method described in relation to FIG. 3. The information signals 11 and 12 delivered at the output of the device 10 come from the post-processing module POST.

Figure 6:
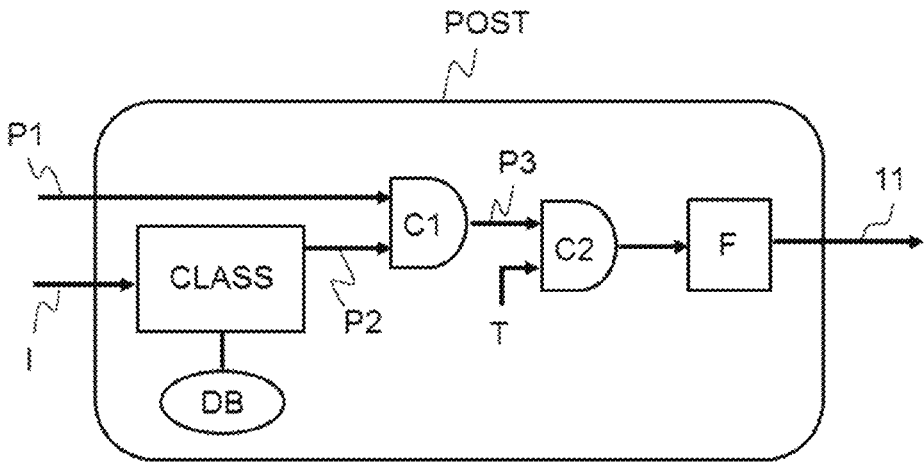

FIG. 6 illustrates schematically and symbolically an internal electronic circuitry of the post-processing module POST configured for carrying out the aforementioned steps S3 and S4 during which the information P1 and P2 are compared by a comparator circuit C1 for generating an information signal P3, together with an optional comparator circuit C2 used for comparing the information P3 with one or more threshold values T and a time filtering circuit F, which is also optional, for performing a time filtering of the output signal, where appropriate.

Thus, the information P1 corresponds to a probability of occurrence of a failure of the sensor 10a such as supplied by the neural network NN, the classifier CLASS determines a statistic P2 of a failure belonging to a type of failure from amongst predefined types of failure stored in the database DB of predefined failures, and the comparison stage C2 and the filter F define, jointly or in isolation, a final decision module, when they are implemented.

Figure 4:
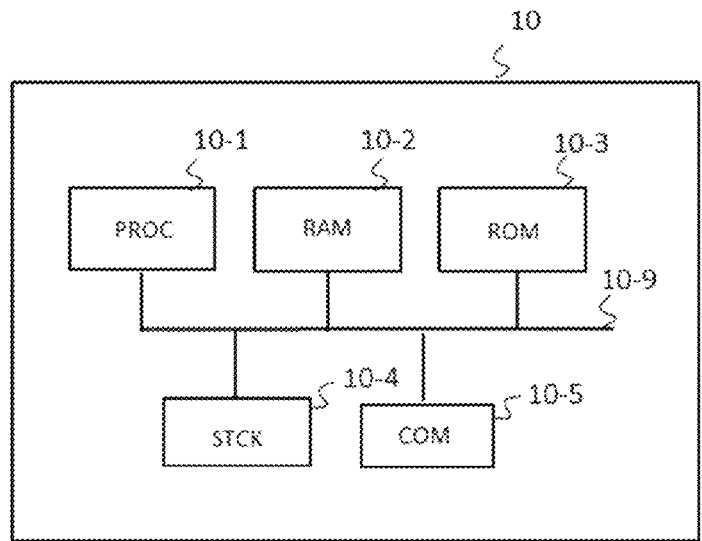
FIG. 4 illustrates schematically an internal architecture of the device for assisting and localizing a failure already illustrated in FIG. 2.

FIG. 4 is a schematic representation of one example of internal architecture of the device for assisting with the detection and the localization of a failure 10. It is considered, by way of illustration, that FIG. 4 illustrates an internal arrangement of the device for assisting with the detection and the localization of a failure 10 such as on board the aircraft 1. It is noted that FIG. 4 could also illustrate schematically one example of hardware architecture of the module for detecting and localizing failures internal to the device for assisting with the detection and the localization of a failure 10.

According to the example of hardware architecture shown in FIG. 4, the device for detecting and localizing failures 10 then comprises, connected via a communications bus 10-9: a processor or CPU (Central Processing Unit) 10-1; a volatile memory RAM (Random Access Memory) 10-2; a non-volatile memory ROM (Read Only Memory) 10-3; a storage unit such as a hard disk (or a storage medium reader, such as an SD (Secure Digital) card reader) 10-4; a communications interface module 10-5 allowing the system of the device for assisting with the detection and the localization of failures 10 to communicate with remote devices, such as other onboard systems of the aircraft 1 amongst which are elements related to the classifier CLASS and to the neural network NN used.

The processor 10-1 of the device for assisting with the detection and the localization of failures 10 is capable of executing instructions loaded into the RAM 10-2 from the ROM 10-3, from an external memory (not shown), from a storage medium (such as an SD card) or from a communications network. When the device for assisting with the detection and the localization of failures 10 is powered up, the processor 10-1 is capable of reading instructions from the RAM 10-2 and of executing them. These instructions form a computer program causing the implementation, by the processor 10-1, of all or part of a method for assisting with the detection and the localization of failures described in relation to FIG. 3 or of variants described of this method.

All or part of the method described in relation to FIG. 4 or its variants described may be implemented in the form of software by execution of a set of instructions by a programmable machine, for example a DSP (Digital Signal Processor) or a microcontroller, or be implemented in hardware form by a machine or a dedicated component, for example an FPGA (Field-Programmable Gate Array) or an ASIC (Application-Specific Integrated Circuit). In general, the system for assisting with the detection and the localization of a failure 10 of a sensor comprises electronic circuitry configured for implementing the method described in relation to itself. It goes without saying that the device for assisting with the detection and the localization of failures 10 furthermore comprises all the elements usually present in a system comprising a control unit and its peripherals, such as a power supply circuit, a power supply supervision circuit, one or more clock circuits, a reset circuit, input-output ports, interrupt inputs, bus drivers, this list being non-exhaustive.

According to one embodiment, the signals processed by the neural network correspond to analogue signals. According to another embodiment, the signals processed by the neural network correspond to digital signals. According to yet another embodiment, the signals processed by the neural network correspond to a combination of analogue signals and of digital signals.

While at least one example embodiment of the invention(s) is disclosed herein, it should be understood that modifications, substitutions, and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for detecting and localizing a failure of an input sensor of a flight control computer of an aircraft, the method being executed by a module for detecting and localizing failures comprising electronic circuitry configured for executing the method, which comprises:

conditioning at least a first signal delivered to the sensor by the flight control computer thereby resulting in a first conditioned signal, and conditioning at least a second signal delivered to the flight control computer by the sensor thereby resulting in a second conditioned signal, according to a predetermined format;

analyzing the first conditioned signal and second conditioned signal, by a neural network trained to carry out a detection and a localization of the failure using the first conditioned signal and the second conditioned signal representative of the first signal and the second signal, respectively, delivered by or to the flight control computer, the neural network delivering a piece of information representative of a probability of occurrence of a failure;

comparison of a first piece of information representative of a first probability of occurrence of the failure, delivered by the neural network, with a second piece of information representative of a second probability of occurrence of the failure, delivered by a classifier trained to carry out a detection and a localization of the failure, using signals representative of the conditioned signals, in order to deliver a piece of information representative of a probability of occurrence of a failure; then, supplying at least a third piece of information representative of a third probability of occurrence of the failure based on the first and second pieces of information.

2. The method for detecting and localizing a failure according to claim 1, further comprising a comparison of the third piece of information with respect to at least one predetermined threshold value.

3. The method for detecting and localizing a failure according to claim 1, further comprising filtering the third piece of information and supplying a fourth piece of information representative of a fourth probability of occurrence of the failure based on the filtered third piece of information.

4. A non-transitory computer program product comprising program code instructions for executing the method according to claim 1 when the instructions are executed by a processor of a device for assisting with detection and localization of failures.

5. A non-transitory computer-readable storage medium comprising the computer program product according to claim 4.

6. A device for assisting with detection and localization of a failure of an input sensor of a flight control computer of an aircraft, the device comprising a module for detecting and localizing a failure comprising electronic circuitry configured for carrying out:

conditioning at least a first signal delivered to the sensor by the flight control computer thereby resulting in a first conditioned signal, and conditioning at least a second signal delivered to the computer by the sensor thereby resulting in a second conditioned signal, according to a predetermined format;

analysis of the first conditioned signal and the second conditioned signal, by a neural network trained to carry out a detection and a localization of the failure using the first conditioned signal and the second conditioned signal which are representative of the first signal and the second signal, respectively, delivered by or to the flight control computer;

comparison of a first piece of information representative of a first probability of occurrence of the failure, delivered by the neural network, with a second piece of information representative of a second probability of occurrence of the failure, delivered by a classifier trained to carry out a detection and a localization of the failure, using signals representative of the conditioned signals; then, supplying at least a third piece of information representative of a third probability of occurrence of the failure based on the first and second pieces of information.

7. The device for assisting with the detection and the localization of a failure according to claim 6, comprising electronic circuitry configured for carrying out filtering of the third piece of information and for carrying out supplying a fourth piece of information representative of a fourth probability of occurrence of the failure based on the filtered third piece of information.

8. A flight control computer device comprising a first processor, configured for determining flight control signals and a device for assisting with detection and localization of a failure according to claim 6, comprising a module for detecting and localizing failures comprising the electronic circuitry, which is independent of the first processor.

9. An aircraft comprising a flight control computer device according to claim 8.

10. An aircraft comprising a device for assisting with detection and localization of a failure according to claim 6.

\* \* \* \* \*